United States Patent
Roger et al.

(10) Patent No.: US 11,567,175 B2
(45) Date of Patent: Jan. 31, 2023

(54) APPARATUSES AND METHOD FOR LIGHT DETECTION AND RANGING

(71) Applicant: Infineon Technologies AG, Neubiberg (DE)

(72) Inventors: Andre Roger, Munich (DE); Wojciech Kudla, Wageningen (NL); Hendrikus Van Lierop, Bj Weert (NL); Jaap Verheggen, Wijchen (NL); Romain Ygnace, Brunnthal (DE)

(73) Assignee: Infineon Technologies AG

( * ) Notice: Subject to any disclaimer, the term of this patent is extended or adjusted under 35 U.S.C. 154(b) by 948 days.

(21) Appl. No.: 16/146,200

(22) Filed: Sep. 28, 2018

(65) Prior Publication Data

US 2019/0101628 A1    Apr. 4, 2019

(30) Foreign Application Priority Data

Sep. 29, 2017   (DE) .......................... 102017122810.1
Nov. 22, 2017   (DE) .......................... 102017127582.7

(51) Int. Cl.
*G01S 7/481*    (2006.01)
*G01S 7/484*    (2006.01)
*G01S 17/42*    (2006.01)

(52) U.S. Cl.
CPC .......... *G01S 7/4817* (2013.01); *G01S 7/484* (2013.01); *G01S 7/4815* (2013.01); *G01S 17/42* (2013.01)

(58) Field of Classification Search
None
See application file for complete search history.

(56) References Cited

U.S. PATENT DOCUMENTS

| | | | |
|---|---|---|---|
| 5,552,893 A * | 9/1996 | Akasu ..................... | G01C 3/00 356/4.01 |
| 6,327,029 B1 * | 12/2001 | Matsuoka ............. | G01S 17/931 356/5.01 |
| 7,969,558 B2 | 6/2011 | Hall | |
| 8,446,571 B2 | 5/2013 | Fiess et al. | |
| 8,767,190 B2 | 7/2014 | Hall | |
| 9,074,883 B2 | 7/2015 | Schumann et al. | |
| 9,417,056 B2 | 8/2016 | Neundorf et al. | |
| 10,627,493 B2 | 4/2020 | Morikawa et al. | |
| 2005/0174560 A1 | 8/2005 | Imber et al. | |

(Continued)

FOREIGN PATENT DOCUMENTS

| CN | 106324589 A | 1/2017 |
|---|---|---|
| DE | 4433082 A1 | 4/1995 |

(Continued)

*Primary Examiner* — Yuqing Xiao
*Assistant Examiner* — Benjamin Richard Hebert
(74) *Attorney, Agent, or Firm* — Design IP (57) ABSTRACT

An apparatus for light detection and ranging is provided. The apparatus includes a reflective surface configured to oscillate about a rotation axis, and a plurality of light sources each configured to controllably emit a respective light beam via an optical system onto the reflective surface. Further, the apparatus includes a controller configured to control emission times of the plurality of light sources so that the reflective surface emits a plurality of light beams to an environment according to a first sequence of beam directions for a first measurement, and according to a second sequence of beam directions for a subsequent second measurement.

28 Claims, 6 Drawing Sheets

(56) References Cited

U.S. PATENT DOCUMENTS

| | | |
|---|---|---|
| 2008/0231498 A1 | 9/2008 | Menzer et al. |
| 2010/0165323 A1 | 7/2010 | Fiess et al. |
| 2010/0296146 A1 | 11/2010 | Krastev et al. |
| 2012/0147147 A1* | 6/2012 | Park .................. G01S 7/4814 348/49 |
| 2014/0168630 A1* | 6/2014 | Iida .................... G01S 17/42 356/3 |
| 2017/0176579 A1* | 6/2017 | Niclass ............... G01S 17/42 |
| 2017/0261612 A1* | 9/2017 | Akiyama ............ G01S 7/4865 |
| 2018/0020115 A1* | 1/2018 | Hipp .................. H04N 1/1931 |
| 2018/0062345 A1* | 3/2018 | Bills .................... G01S 17/10 |
| 2019/0011567 A1* | 1/2019 | Pacala ................ G01S 7/4815 |
| 2020/0249354 A1* | 8/2020 | Yeruhami ............ G01S 17/32 |

FOREIGN PATENT DOCUMENTS

| | | |
|---|---|---|
| DE | 10 2008 055 159 A1 | 7/2010 |
| EP | 3165946 A1 | 5/2017 |
| JP | 07084045 A | 3/1995 |
| JP | 2007278940 A | 10/2007 |
| JP | 2017090144 A | 5/2017 |
| JP | 2017122673 A | 7/2017 |

\* cited by examiner

APPARATUSES AND METHOD FOR LIGHT DETECTION AND RANGING

FIELD

The present disclosure relates to LIght Detection And Ranging (LIDAR). In particular, examples relate to apparatuses and a method for LIDAR.

BACKGROUND

Automotive LIDAR (as well as other applications) uses high power lasers for illuminating the environment. These LIDAR systems need to comply with laser safety regulations, which may limit the usable laser power. Furthermore, vehicle displacement during measurements may cause motion blurring. Hence, there may be a demand for improved LIDAR techniques.

SUMMARY

Such a demand may be satisfied by examples described herein.

An example relates to an apparatus for LIDAR. The apparatus includes a reflective surface configured to oscillate about a rotation axis, and a plurality of light sources each configured to controllably emit a respective light beam via an optical system onto the reflective surface. Further, the apparatus includes a controller configured to control emission times of the plurality of light sources so that the reflective surface emits a plurality of light beams to the environment according to a first sequence of beam directions for a first measurement, and according to a second sequence of beam directions for a subsequent second measurement.

Another example relates to a method for LIDAR. The method uses a reflective surface configured to oscillate about a rotation axis, and a plurality of light sources each configured to controllably emit a respective light beam via an optical system onto the reflective surface. The method includes controlling emission times of the plurality of light sources so that the reflective surface emits a plurality of light beams to the environment according to a first sequence of beam directions for a first measurement, and according to a different second sequence of beam directions for a subsequent second measurement.

Further, examples relate to a computer program having a program code configured to perform the above method, when the computer program is executed on a computer or processor. Additionally, examples relate to a non-transitory machine (computer) readable medium having stored thereon the program.

Still another example relates to a further apparatus for LIDAR. The apparatus includes an illumination circuit configured to repeatedly emit a plurality of light beams to the environment according to a first sequence of beam directions for a first measurement, and emit a plurality of light beams according to a second sequence of beam directions for a subsequent second measurement.

BRIEF DESCRIPTION OF THE DRAWINGS

Some examples of apparatuses and/or methods will be described in the following by way of example only, and with reference to the accompanying figures, in which.

DETAILED DESCRIPTION

Various examples will now be described more fully with reference to the accompanying drawings in which some examples are illustrated. In the figures, the thicknesses of lines, layers and/or regions may be exaggerated for clarity.

Accordingly, while further examples are capable of various modifications and alternative forms, some particular examples thereof are shown in the figures and will subsequently be described in detail. However, this detailed description does not limit further examples to the particular forms described. Further examples may cover all modifications, equivalents, and alternatives falling within the scope of the disclosure. Like numbers refer to like or similar elements throughout the description of the figures, which may be implemented identically or in modified form when compared to one another while providing for the same or a similar functionality.

It will be understood that when an element is referred to as being "connected" or "coupled" to another element, the elements may be directly connected or coupled or via one or more intervening elements. If two elements A and B are combined using an "or", this is to be understood to disclose all possible combinations, i.e., only A, only B as well as A and B. An alternative wording for the same combinations is "at least one of A and B". The same applies for combinations of more than two elements.

The terminology used herein for the purpose of describing particular examples is not intended to be limiting for further examples. Whenever a singular form such as "a", "an", and "the" is used and using only a single element is neither explicitly or implicitly defined as being mandatory, further examples may also use plural elements to implement the same functionality. Likewise, when a functionality is subsequently described as being implemented using multiple elements, further examples may implement the same functionality using a single element or processing entity. It will be further understood that the terms "comprises," "comprising", "includes", and/or "including", when used, specify the presence of the stated features, integers, steps, operations, processes, acts, elements and/or components, but do not preclude the presence or addition of one or more other features, integers, steps, operations, processes, acts, elements, components and/or any group thereof.

Unless otherwise defined, all terms (including technical and scientific terms) are used herein in their ordinary meaning of the art to which the examples belong.

Figure 1:
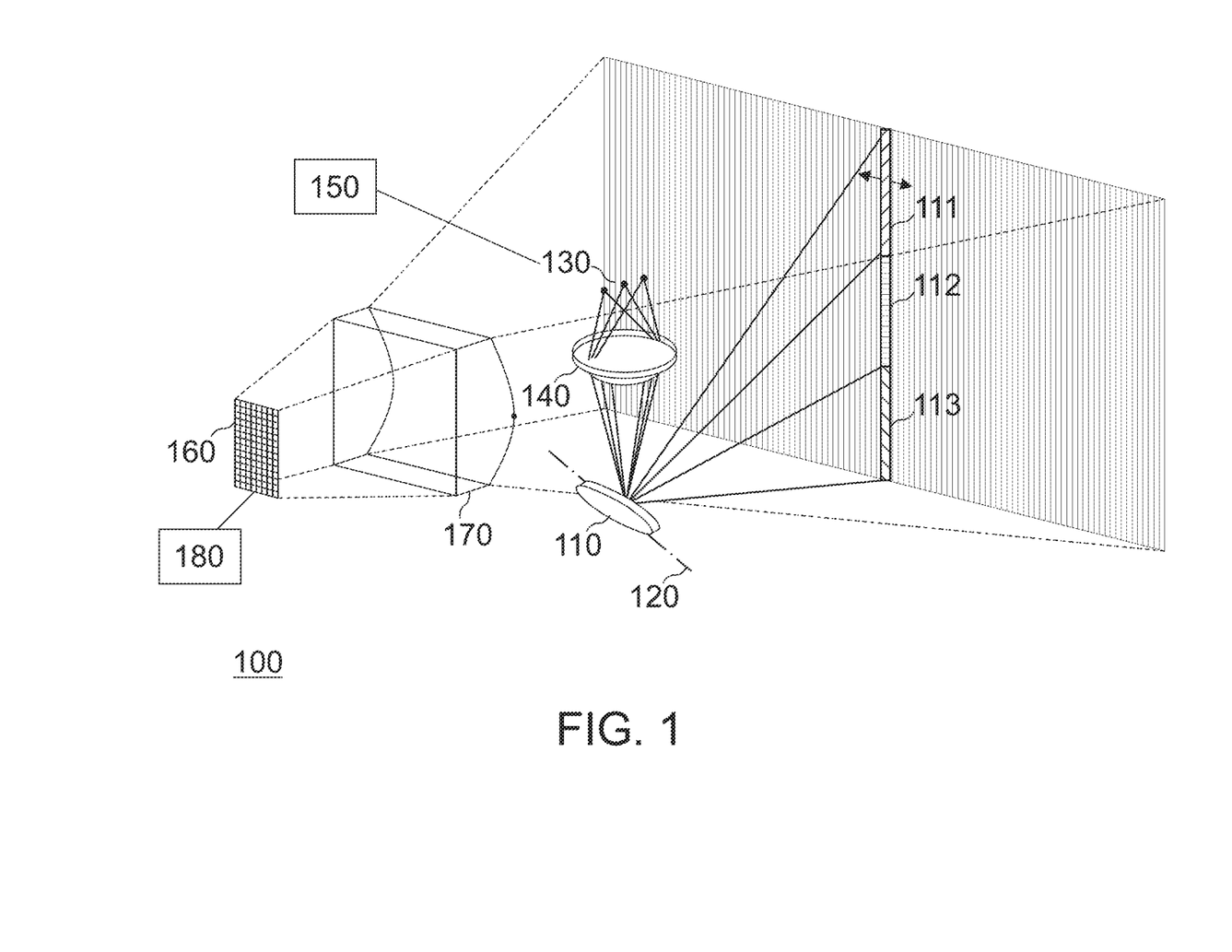
FIG. 1 illustrates an example of an apparatus for LIDAR according to one or more embodiments.

FIG. 1 illustrates an apparatus 100 for LIDAR. Apparatus 100 comprises a reflective surface 110 configured to oscillate about a single rotation axis 120. That is, the reflective surface 110 rotates about the rotation axis 120 along a first rotation direction from a first end position to a second end position, and vice versa, i.e. along a reverse second rotation direction from the second end position to the first end position. For example, the oscillation movement of the reflective surface rotating around a single rotation axis 120 may comprise rotations along both rotation directions between 2° and 45°. An oscillation frequency of the reflective surface 110 about the rotation axis 120 may be adjustable (e.g. by controller 150). For example, the reflective surface 110 may oscillate about the rotation axis 120 at frequencies between 10 Hz and 100 kHz (e.g. at 2.5 kHz). The reflective surface 110 may be implemented in many different ways. In some examples, the reflective surface 110 may be a MEMS (MicroElectroMechanical System) mirror. LIDAR devices rotating around a single rotation axis may sometimes be referred to as 1D (one dimension) scanning LIDAR devices. The LIDAR apparatus 100 may include a MEMS mirror of a size larger than the MEMS mirror of a 2D scanning device allowing multiple laser light pulses from different directions to be reflected to the field of view.

Further, apparatus 100 comprises a plurality of light sources 130 (e.g. two, three, four, or more light sources). Each of the plurality of light sources 130 is configured to controllably emit a respective light beam via an optical system 140 onto the reflective surface 110. The plurality of light sources 130 may be any device or circuitry capable of emitting light. The plurality of light sources 130 may comprise identical or different light sources. The light beams emitted by the plurality of light sources 130 may be identical or different. For example, the plurality of light sources 130 may emit light beams of identical or different colors, i.e. wavelengths. In general, the plurality of light sources 130 may emit light beams of any wavelength. The plurality of light sources 130 may, e.g., emit infrared light beams. The light beams emitted by the plurality of light sources 130 may, in general, exhibit any desired shape. For example, plurality of light beams may have a substantially rectangular cross-section in a plane perpendicular to its beam direction (i.e. the light beam may be line- or strip shaped). The plurality of light sources 130 may, in some examples, be lasers so that the light beams are (pulsed) laser beams.

The optical system 140 may comprise one or more optical lenses in order to focus (project) the light beams emitted by the plurality of light sources 130 to specific (pre-defined) positions on the reflective surface 110.

Apparatus 100 additionally comprises a controller 150 for controlling the plurality of light sources 130. The controller 150 may be implemented in the form of dedicated hardware, such as a processor, an Application Specific Integrated Circuit (ASIC), or a Field Programmable Gate Array (FPGA), as well as hardware capable of executing software in association with appropriate software. The controller 150 may further comprise a memory, such as Read Only Memory (ROM), Random Access Memory (RAM), or non-volatile storage, for storing software or other control data.

The controller 150 is configured to control emission times of the plurality of light sources 130 so that the reflective surface 110 emits a plurality of light beams to the environment according to a first sequence of beam directions for a first measurement, and according to a second sequence of beam directions for a subsequent second measurement. The beam directions of the second sequence of beam directions are different from the beam directions of the first sequence of beam directions. For example, the beam directions of the second sequence of beam directions may be offset along a spatial axis from the beam directions of the first sequence of beam directions.

In some examples, the controller 150 may, e.g., be configured to control the plurality of light sources 130 to sequentially emit their respective light beam onto the reflective surface 110. In other words, the controller 150 may control the plurality of light sources 130 such that only one of the plurality of light sources 130 emits its respective light beam onto the reflective surface at a time. Alternatively, the controller may be configured to control at least two of the plurality of light sources 130 to simultaneously emit their respective light beam onto the reflective surface 110. That is, the controller 150 may control the plurality of light sources 130 such that two or more light beams are simultaneously emitted onto the reflective surface by the plurality of light sources 130. The emission times may, e.g., be stored in a memory (look-up table) accessible by the controller 150.

The reflective surface 110 may, hence, either emit a single light beam or a plurality of light beams to the environment at defined points in time. FIG. 1 illustrates a situation in which tree light beams 111, 112 and 113 are simultaneously emitted to the environment by the reflective surface 110. However, it is to be noted that also any other number of light beams may be simultaneously emitted to the environment. Further, the beam directions of the light beams may be different from the beam directions of light beams 111, 112 and 113 illustrated in FIG. 1.

The controller 150 may allow to sequentially and fully scan (light, illuminate) partial areas of the apparatus 100's field of view in order to enable a full scan of the environment. For example, the first sequence of beam directions corresponds to a first part of the apparatus 100's field of view, whereas the second sequence of beam directions corresponds to a different second part of the apparatus 100's field of view. In other words, each sequence of beam directions (i.e. each measurement) comprises a subset of a plurality of predefined beams directions along which light beams are to be emitted. By defining two or more sequences of beam directions for the emitted light beams of subsequent measurements, different parts of the apparatus 100's field of view may be scanned in each measurement.

The reflections of the emitted light beams are received by a photodetector 160. The photodetector 160 comprises a plurality of photosensitive elements arranged in at least one row, i.e. one or more parallel rows of photosensitive elements (which may be understood as an array of photosensitive elements). Each of the plurality of photosensitive elements is configured to receive a reflection of at least one of the plurality of light beams from an object in the environment. For example, the photodetector 160 may be a one-dimensional or a two-dimensional array of photosensitive pixels. As indicated in FIG. 1, the apparatus 100 may optionally further comprise another optical system 170 (e.g. comprising one or more lenses) configured to project the reflection of at least one of the plurality of emitted light beams from an object in the environment onto the photodetector 160. The photodetector 160, hence, receives the reflection of at least one of the plurality of emitted light beams from the object in the environment. A processor 180 may determine a distance (of the apparatus 100) to the object in the environment based on the emission time of the one of the plurality of light beams and a reception time of the reflection. That is, the distance to the object is determined by a Time-of-Flight (ToF) measurement.

In order to increase the Signal-to-Noise Ratio (SNR), plural measurements may be averaged (also known as "histogramming"). However, histogramming conventionally suffers from motion blurring. Assuming that during a single measurement, light beams are emitted along all of the plurality of beam directions (i.e. the full field of view is scanned), a significant displacement of the LIDAR system may take place before a light beam is emitted along the same beam direction for a second time. This may become more evident from the following non-limiting numerical example.

In this numerical example, it is assumed as a reference that in a conventional LIDAR system single light beams (e.g. laser pulses) are sequentially emitted along 500 beam directions. Further, it is assumed that the emission of two consecutive light beams is separated by 20 µs in time. Accordingly, one full measurement takes 500*20 µs=10000 µs=10 ms. That is, it takes 10 ms before a light beams is again emitted along the same beam direction.

For example, if the LIDAR system is used in an automotive vehicle travelling with a speed of 200 km/h, this corresponds to a vehicle displacement and, hence, to a displacement of the LIDAR system of 55 cm. If the measurement is repeated more often, a displacement of 55 cm occurs for each measurement. The histogramming, hence, suffers from motion blurring.

The proposed sequential scanning approach may enable to reduce motion blurring. The controller 150 may be configured to control the emission times of the plurality of light sources 130 so that the reflective surface 110 repeatedly emits the plurality of light beams to the environment according to the first sequence of beam directions during the first measurement.

Referring to the above numerical example, the first sequence of beam directions may only comprise five out of the 500 beam directions. Accordingly, between two emissions of light beams along the same beam direction, merely a time of (500/100)*2*20 µs=200 µs takes place. Hence, a displacement of only 10 mm occurs. The motion blurring may be (significantly) reduced. Accordingly, the precision of the distance (range) measurement may be (significantly) improved.

After repeatedly emitting light beams along the first sequence of beams directions (e.g. 3 repetitions), light beams may be repeatedly emitted along second, third, and further sequences of beam directions (during second, third and further subsequent measurements) until light beams are emitted along all of the plurality of beam directions. Accordingly, the precision of each partial distance (range) measurement may be improved, so that the determination of distances to objects in the apparatus 100's field of view as whole may be improved.

Using different sequences of beam directions may further allow to increase safety since non-adjacent beam directions may be used for consecutively emitted light beams. Accordingly, the emission of (too) high amounts of optical energy to a specific point in the environment (e.g. to a human eye) may be avoided. In particular, the repeated emission of optical energy to a specific point in the environment within a short time span (e.g. five microseconds or less) may be avoided. In other words, the controller 150 may be configured to control the emission times of the plurality of light sources 130 such that light beams are emitted to the environment along the same beam direction or along adjacent beam directions only once within a predefined time span (e.g. five microseconds or less). Compared to conventional approaches, the apparatus 100 may, hence, use light beams with increased power (intensity) or at a higher repetition frequency so that the photodetector 160 may also detect reflections from objects which are located further away from apparatus 100. Accordingly, the apparatus 100 may allow to determine distances to objects at greater distances than conventional approaches.

In the following some exemplary sequences of beam directions (also denoted as beam patterns) are described in connection with FIGS. 2 to 8. The exemplary sequences of beam directions are described as examples of the first sequence of beam directions used for the first measurement. However, it is to be noted that the exemplary sequences of beam directions may also be used for any subsequent sequence of beam directions, i.e. any subsequent measurement (e.g. the second, third, fourth etc.).

Figure 2:
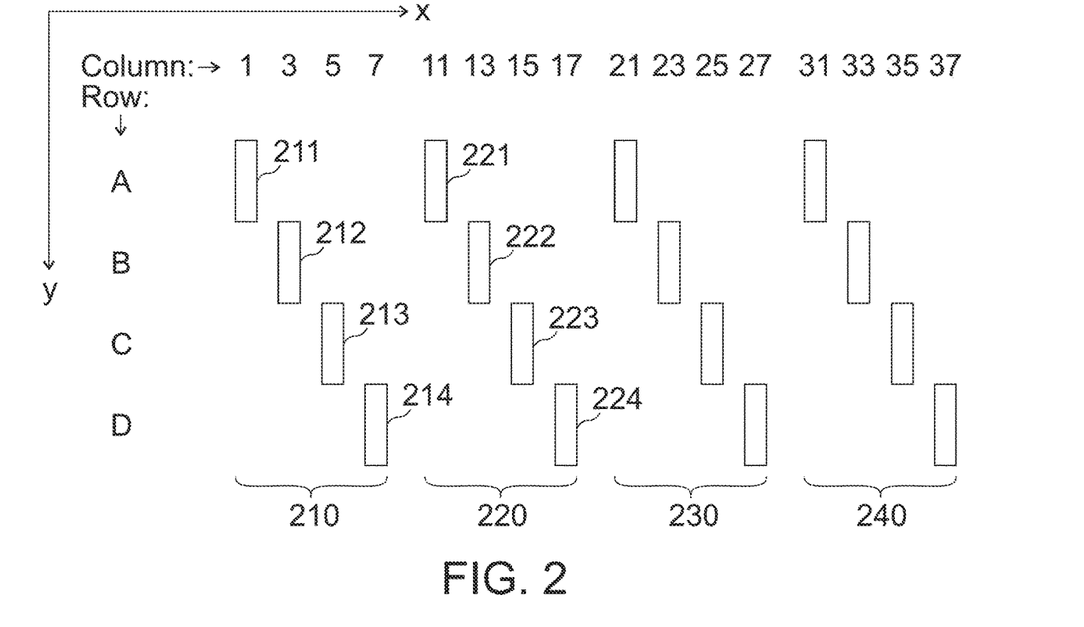
FIGS. 2 to 8 illustrate exemplary beam sequences according to one or more embodiments.

FIG. 2 illustrates an exemplary first sequence of beam directions. In the example of FIG. 2, the controller 150 controls the plurality of light sources 130 to sequentially emit their respective light beam onto the reflective surface 110. That is, the reflective surface 110 emits a single light beam to the environment at a time.

The plurality of predefined beam directions are uniformly distributed along a first spatial axis y and along a second spatial axis x. The first spatial axis y and the second spatial axis x may be perpendicular to each other as illustrated in FIG. 2.

The first sequence of beam directions comprises a sequence of a first subset 210, a second subset 220, a third subset 230 and a fourth subset 240 of the plurality of predefined beam directions. It is to be noted that any number subsets of the plurality of predefined beam directions may be used.

The first subset 210 comprises four beam directions 211, 212, 213 and 214. The four beam directions 211, 212, 213 and 214 succeed each other along the first axis y. This is indicated in FIG. 2 by the alternative notation (grouping) of the plurality of beam directions in columns and in rows. As illustrated in FIG. 1, beam directions that are adjacent along the first spatial axis y and that are (substantially) identical along the second spatial axis x may be understood as beam directions of a same column (denoted 1, 2, 3, . . . ). Beam directions that are adjacent along the second spatial axis x and that are (substantially) identical along the first spatial axis y may be understood as beam directions of a same row (denoted A, B, C, D . . . ). In the example of FIG. 2, the four beam directions 211, 212, 213 and 214 of the first subset 210 belong to adjacent rows A, B, C and D.

The four beam directions 211, 212, 213 and 214 of the first subset 210 are offset along the second spatial axis x from each other by a first number of intermediate beam directions of the plurality of predefined beam directions. In the example of FIG. 2, the second beam direction 212 is offset from the first beam direction 211 along the second axis x by one intermediate beam direction of the plurality of predefined beam directions. This may become more evident from the alternative column notation: The first beam direction 211 belongs to column 1, whereas the second beam direction 212 belongs to column 3. That is, the first beam direction 211 and the second beam direction 212 are offset from each other by the intermediate beam direction of column 2. Similarly, the third beam direction 213 is offset from the second beam direction 212 along the second axis x by one intermediate beam direction of the plurality of predefined beam directions, and the fourth beam direction 214 is offset from the third beam direction 213 along the second axis x by one intermediate beam direction of the plurality of predefined beam directions.

The sequential emission of light beams to the environment by the reflective surface 110 along the four beam directions 211, 212, 213 and 214 of the first subset 210 is achieved by controlling the respective emission times of, e.g., four light sources. For example, the controller 150 controls a first one of the four light sources at a time $T_1$ to emit its light beam. The light beam is projected onto the reflective surface 110 at a first position by the optical system 140. Accordingly, a light beam is emitted to the environment along the first beam direction 211. At a time $T_2$, the controller 150 controls a second one of the four light sources to emit its light beam. The light beam is projected onto the reflective surface 110 at a second position by the optical system 140. The different projections of the light beams of the first and the second light source onto the reflective surface 110 varies the beam directions of the two light beams (when emitted to the environment) along the first spatial axis y. Since the reflective surface 110 continues its oscillation movement between emission times $T_1$ and $T_2$, the beam directions of the two light beams (when emitted to the environment) are further varied along the second spatial axis x. Accordingly, the second light beam is emitted by the reflective surface 110 to the environment along the second beam direction 212. Similarly, the controller 150 controls a third and a fourth one of the four light sources to emit their respective light beams at times $T_3$ and $T_4$, so that light beams are emitted by the reflective surface 110 to the environment along the third beam direction 213 and the fourth beam direction 214.

In the example of FIG. 2, it is assumed that the four beam directions 211, 212, 213 and 214 of the first subset 210 are offset along the second spatial axis x from each other by one intermediate beam direction of the plurality of predefined beam directions. However, it is to be noted that any number of intermediate beam directions may be used (e.g. 1, 2, 3, . . . , 10, or more). Further, the four beam directions 211, 212, 213 and 214 of the first subset 210 are equally offset along the second spatial axis x from each other (i.e. succeeding ones of the four beam directions 211, 212, 213 and 214 are offset by the same number of intermediate beam directions). However, the number of intermediate beam directions between succeeding ones of the beam directions of the first subset 210 may vary. For example, the second beam direction 212 may be offset from the first beam direction 211 along the second axis x by one intermediate beam directions of the plurality of predefined beam directions, whereas the third beam direction 213 may be offset from the second beam direction 212 along the second axis x by three intermediate beam directions of the plurality of predefined beam directions.

That is, the beam directions of the first subset 210 are adjacent to each other along the first spatial axis y. Further, the beam directions of the first subset 210 are offset along the second spatial axis x from each other by one of a set of first numbers of intermediate beam directions of the plurality of predefined beam directions.

The beam directions 221, 222, 223 and 224 of the second subset 220 are offset along the second spatial axis x from the beam directions 211, 212, 213 and 214 of the first subset 210 by ten intermediate beam directions (e.g. beam direction 221 is in column 11, whereas beam direction 211 is in column 1). However, it is to be noted that any number of intermediate beam directions along the second spatial axis x may be used. Also the beam directions 221, 222, 223 and 224 of the second subset 220 are adjacent to each other along the first spatial axis y (i.e. belong to adjacent rows A, B, C and D). That is, the beam directions of the second subset 220 are offset along the second spatial axis x from the beam directions of the first subset 210 by a second number of intermediate beam directions of the plurality of predefined beam directions.

The subsequent sequential emission of light beams to the environment by the reflective surface 110 along the four beam directions 221, 222, 223 and 224 of the second subset 220 is again achieved by controlling the respective emission times of the four light sources. At a time $T_5$, i.e. after a lapse of a defined time after firing the fourth light source for emitting a light beam along beam direction 214, the first light source is controlled by the controller 150 to emit its light beam. The light beam is again projected onto the reflective surface 110 at the first position by the optical system 140. Since, the reflective surface continued its oscillation movement, a light beam is emitted to the environment along the beam direction 221 of the second subset. As described above for the beam directions of the first subset 210, the other light sources are controlled to emit their respective light beams in order to emit light beams to the environment along the remaining beam directions 222, 223 and 224 of the second subset 220.

The first number and the second number of intermediate beam directions may be adjusted by the controller 150 by selecting the time between succeeding emission times of the plurality of light sources 130. As indicated in FIG. 2, at least one of the first number and/or the second number may be larger than one. This may further allow to increase safety since non-adjacent beam directions are used for consecutively emitted light beams. Accordingly, the emission of (too) high amounts of optical energy to a specific point in the environment (e.g. to a human eye) may be avoided. Compared to conventional approaches, the beam pattern of FIG. 2 may, hence, allow to use light beams with increased power (intensity) so that the photodetector 160 may also detect reflections from objects which are located further away from apparatus 100. Accordingly, the beam pattern of FIG. 2 may allow to determine distances to objects at greater distances than conventional approaches.

The beam directions 231, 232, 233 and 234 of the third subset 230 are offset along the second spatial axis x from the beam directions 221, 222, 223 and 224 of the second subset 220 by ten intermediate beam directions (e.g. beam direction 231 is in column 21, whereas beam direction 221 is in column 11). However, it is to be noted that any number of intermediate beam directions along the second spatial axis x may be used. Also the beam directions 231, 232, 233 and 234 of the third subset 230 are adjacent to each other along the first spatial axis y (i.e. belong to adjacent rows A, B, C and D). That is, the beam directions of the third subset 230 are offset along the second spatial axis x from the beam directions of the second subset 220 by a third number of intermediate beam directions of the plurality of predefined beam directions. As indicated in FIG. 2, the third number of intermediate beam directions may be equal to the second number of intermediate beam directions. However, it is to be noted that the third number of intermediate beam directions may alternatively differ from the second number of intermediate beam directions. For example, the third number may be between 60% and 140% of the second number. This may allow to further increase safety since the distances between adjacent subsets of beam directions along the second spatial axis x are similar. Accordingly, the emission of (too) high amounts of optical energy to a specific point in the environment (e.g. to a human eye) may be avoided.

The emission of light beams to the environment along the beam directions 231, 232, 233 and 234 of the third subset 230 is controlled by the controller 150 as described above for the beam directions of the first subset 210 and the second subset 220.

The beam directions of the fourth subset 240 are offset along the second spatial axis from the beam directions of the third subset 230 by a fourth number of intermediate beam directions (e.g. ten intermediate beam directions). Light beams are emitted along the beam directions of the fourth subset 240 in the same way as described above. In order to avoid repetitions, it is referred to the principles described above in connection with the first subset 210 and the second subset 220.

In other words, FIG. 2 may describe a beam pattern in which four lasers are fired sequentially (e.g., A→B→C→D). Every ToF measurement may, e.g., take about 2 μs (for 300 m distance measurement) plus some additional dead time of, e.g., 1 µs to avoid range ambiguity. The total sequence for one subset, hence, takes 4*(2+1)=12 µs. In the meantime, the reflective surface (e.g. a MEMS mirror) continues moving and leads to the pattern illustrated in FIG. 2. For example, the dead time may be chosen such that the next laser is fired when the MEMS mirror is exactly aligned with a new pixel of the photodetector. The dead time may be not constant when, e.g., a resonant MEMS mirror having a sinusoidal motion profile is used.

Although not explicitly illustrated in FIG. 2, the controller 150 may optionally control the plurality of light sources 130 to emit respective light beams related to a first part of the first sequence while the reflective surface 110 rotates about the rotation axis 120 along a first rotation direction, and control the plurality of light sources 130 to emit their respective light beams related to a second part of the first sequence while the reflective surface 110 rotates about the rotation axis 120 along the opposite second rotation direction. For example, light beams may be emitted to the environment along the first subset 210 and the third subset 230 while the reflective surface 110 rotates along the first rotation direction, whereas light beams are emitted to the environment along the second subset 220 and the fourth subset 240 while the reflective surface 110 rotates along the second rotation direction.

Figure 3:
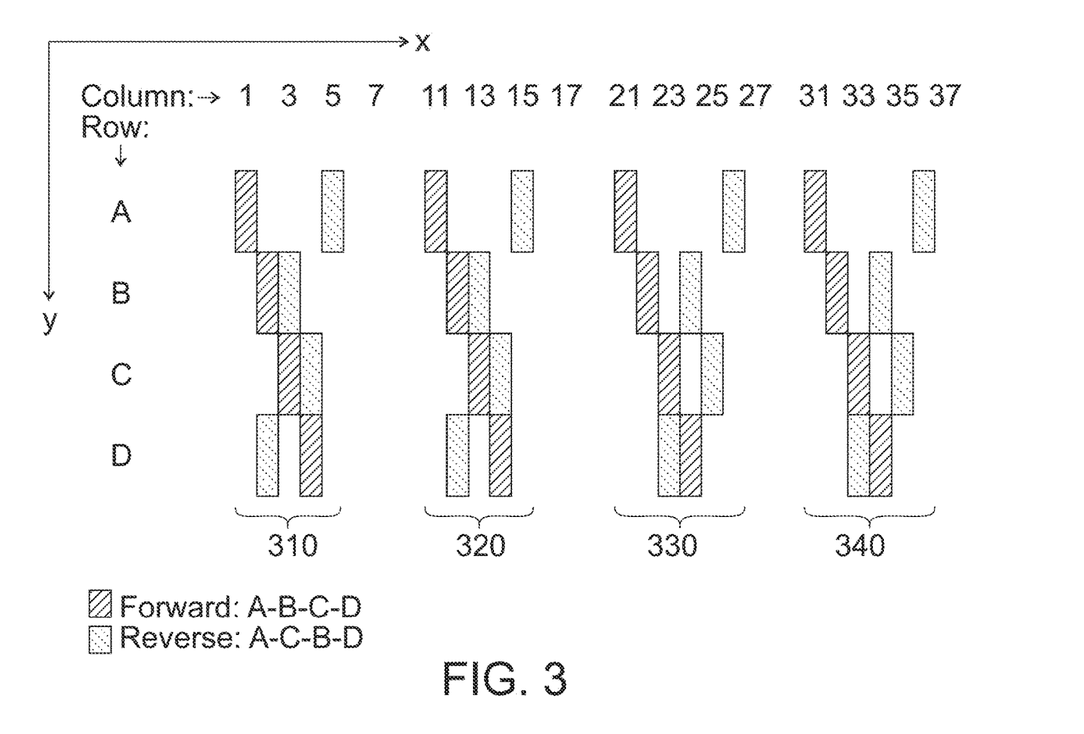

FIG. 3 illustrates another exemplary first sequence of beam directions. In the example of FIG. 3, the controller 150 again controls the plurality of light sources 130 to sequentially emit their respective light beam onto the reflective surface 110. That is, the reflective surface 110 emits a single light beam to the environment at a time.

In the example of FIG. 3, the controller 150 controls the plurality of light sources 130 to emit respective light beams related to a first part of the first sequence while the reflective surface 110 rotates about the rotation axis 120 along a first rotation direction (also denoted as forward direction), and controls the plurality of light sources 130 to emit their respective light beams related to a second part of the first sequence while the reflective surface 110 rotates about the rotation axis 120 along the opposite second rotation direction (also denoted as backward direction).

In the exemplary first sequence of FIG. 3, the emission sequence of the plurality of light sources 130 is varied during the emission of light beams to the environment according to the first sequence of beam directions. This may allow to reduce the time between two succeeding emission times of the plurality of light sources 130.

Assuming an object in the environment that is a big and strong reflector for a light beam emitted by the reflective surface 110, the object may be detected up to a distance of, e.g., 600 m. Due to the strength of the reflection and due to inevitable optical and electrical crosstalk within the further optical system 170 and the photodetector 160, the reflection of the light beam from the object (i.e. the returned light) may effectively reach any pixel of the photodetector 160. In order to avoid range ambiguity, the dead time needs to be adjusted/increased accordingly (e.g. to 2 µs or more). Accordingly, the ToF measurements of four sequentially fired light sources take, e.g., 4*(2+2)=16 µs. In other words, the light sources 130 may be fired with an upper frequency of 62.5 kHz. However, it may be desired to use higher frequencies. Higher frequencies may be achieved by using histogramming (i.e. repeating the measurement and taking the sum). In the histogram, repeatable triggers are adding up, whereas random triggers are not. If the above described unwanted detections of reflections that occur during the dead time are not adding up, then the dead time may be reduced or even eliminated. This may be achieved by not firing the same row after the previous one (i.e. not using the same emission sequence of the plurality of light sources when a subset of the plurality of beam directions is repeated a plurality of times). For example, the emission sequences A-B-C-D (light source 1—light source 2—light source 3—light source 4), A-C-B-D (light source 1—light source 3—light source 2—light source 4) and A-D-C-B (light source 1—light source 4—light source 3—light source 2) may be consecutively used if four light sources are employed. This row pattern is changed for each histogramming pass, i.e. for each new line that is scanned (either forward or reverse), and only repeated when all possible combinations have been used or when the histogramming has finished.

In accordance with the above description of the variation of the emission sequence of the plurality of light sources 130, the beam directions A1 (row A, column 1), A2, . . . , A5, B1, . . . , B5, C1, . . . , C5, and D1, . . . , D5 form a first subset 310 of the plurality of predefined beam directions. Assuming again four light sources, first light source 1, then light source 2, then light source 3 and finally light source 4 sequentially emit their respective light beam, while the reflective surface 110 rotates about the rotation axis 120 along the first rotation direction (forward). Accordingly, light beams are emitted along beam directions A1, B2, C3 and D4 to the environment. While the reflective surface 110 rotates about the rotation axis 120 along the second rotation direction (backward), first light source 1, then light source 3, then light source 2 and finally light source 4 sequentially emit their respective light beam. Accordingly, light beams are emitted along beam directions A5, C4, B3 and D2 to the environment. While the reflective surface 110 rotates again about the rotation axis 120 along the first rotation direction, first light source 1, then light source 4, then light source 2 and finally light source 3 sequentially emit their respective light beam. Accordingly, light beams are emitted along beam directions A1, D2, B3 and C4 to the environment. While the reflective surface 110 rotates again about the rotation axis 120 along the second rotation direction, first light source 1, then light source 2, then light source 4 and finally light source 3 sequentially emit their respective light beam. Accordingly, light beams are emitted along beam directions A5, B4, D3 and C2 to the environment. By using further (or all) of the remaining permutations of the emission sequence of the plurality of light sources 130, light beams are repeatedly emitted to the environment by the reflective surface 110 along the beam directions of the first subset 310 of the plurality of predefined beam directions. However, every time the emission sequence of the plurality of light sources 130 changes.

Similarly, a second subset 320, a third subset 330, a fourth subset 340 etc. of the plurality of predefined beam directions may be defined. Accordingly, light beams may be repeatedly emitted to the environment by the reflective surface 110 along the beam directions of the second subset 320, the third subset 330, the fourth subset 340 etc. of the plurality of predefined beam directions That is, the exemplary first sequence of beam directions as illustrated in FIG. 3 comprises a subset of a plurality of predefined beam directions a plurality of times, wherein the controller 150 controls the emission times of the plurality of light sources 130 so that an emission sequence of the plurality of light sources 130 related to the subset of the plurality of predefined beam directions varies (during the first measurement).

The second sequence of beam directions used for the subsequent second measurement may be accordingly structured using different beam directions of the plurality of beam direction.

While in the exemplary first sequences of beam directions illustrated in FIGS. 2 and 3, single light beams are emitted to the environment at a time, a plurality of light beams are emitted to the environment at a time by the reflective surface 110 in the exemplary first sequences of beam directions illustrated in FIGS. 4 to 8.

Figure 4:
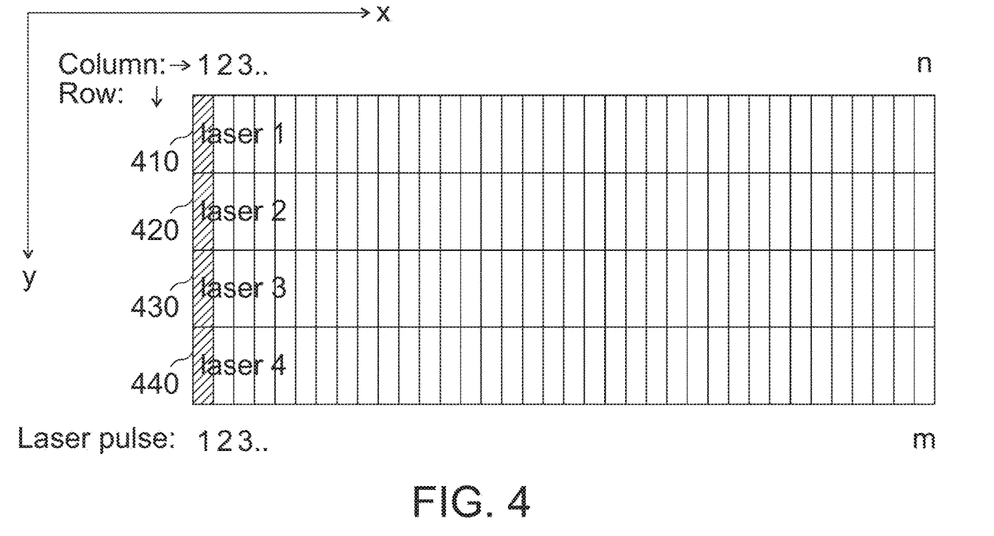

FIG. 4 illustrates a configuration in which the plurality of light sources 130 comprises 4 light sources which are controlled by controller 150 to simultaneously emit their respective light beam onto the reflective surface 110. Accordingly, four light beams 410, 420, 430 and 440 are emitted to the environment by the reflective surface 110 at the same time. The light beams 410, 420, 430 and 440 are adjacent to each other along the first spatial axis y since the emitted light beams of the four light sources are projected on the reflective surface 110 at different positions. As indicated in FIG. 4 by means of the column and row notation, n columns and m rows (for m light sources) of beam directions may be provided in general. That is, the plurality of beam directions may comprises m*n beam directions for m light sources.

Since the reflective surface 110 is moving, light beams may be emitted along the beam directions of each of the n columns by controlling the respective emission times of the m light sources (e.g. 4 light sources as indicated in FIG. 4).

In the exemplary first sequences of beam directions illustrated in FIGS. 5 to 8, it is assumed that the plurality of light sources 130 comprises 4 light sources. However, it is to be noted that any other number of light sources may be used as well (e.g. 2, 3, 5, 6 or more light sources).

Figure 5:
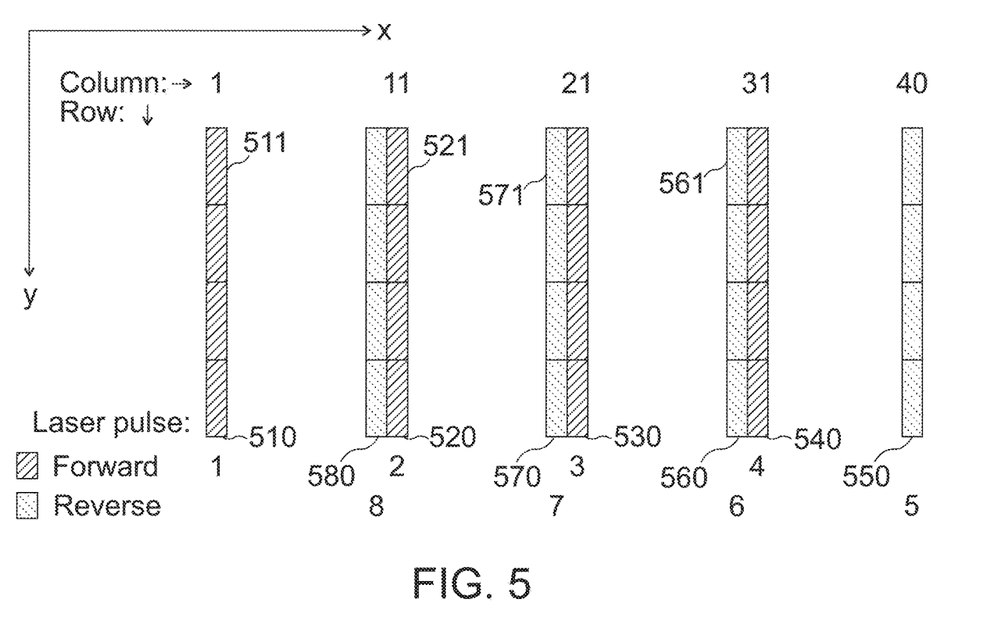

An exemplary first sequence of beam directions is illustrated in FIG. 5. In the example of FIG. 5, the first sequence of beam directions comprises a sequence of first subsets 510, 520, 530, 540 of the plurality of predefined beam directions. The beam directions of each of the first subsets 510, 520, 530, 540 are adjacent to each other along the first spatial axis y. Further, the beam directions of each of the first subsets 510, 520, 530, 540 are offset along the second spatial axis x from the beam directions of a preceding one of the first subsets 510, 520, 530, 540 by a first non-zero number of intermediate beam directions of the plurality of predefined beam directions. For example, the beam direction 521 of the first subset 520 (column 11) is offset along the second spatial axis x from beam direction 511 of the first subset 510 (column 1) by nine intermediate beam directions of the plurality of predefined beam directions.

In the example of FIG. 5, it is assumed that the beam directions of each of the first subsets 510, 520, 530, 540 are offset along the second spatial axis x from the beam directions of a preceding one of the first subsets 510, 520, 530, 540 by a constant first non-zero number of intermediate beam directions of the plurality of predefined beam directions. However, the first number of intermediate beam directions between succeeding ones of the first subsets 510, 520, 530, 540 may vary. For example, the beam directions of the first subset 520 may be offset along the second spatial axis x from the beam directions of the first subset 510 by nine intermediate beam directions, whereas the beam directions of the first subset 530 may be offset along the second spatial axis x from the beam directions of the first subset 520 by fifteen intermediate beam directions. That is, the beam directions of each of the first subsets 510, 520, 530, 540 are offset along the second spatial axis y from the beam directions of a preceding one of the first subsets 510, 520, 530, 540 by one of a set of first non-zero numbers of intermediate beam directions of the plurality of predefined beam directions.

The controller 150 controls the four light sources to emit respective light beams related to the first subsets 510, 520, 530, 540 while the reflective surface 110 rotates about the rotation axis 120 along a first rotation direction (also denoted as forward direction). While the reflective surface 110 rotates about the rotation axis 120 along an opposite second rotation direction (also denoted as backward direction), the controller 150 controls the four light sources to emit their respective light beams related to second subsets 550, 560, 570, 580 of the plurality of predefined beam directions.

That is, the first sequence of beam directions further comprises a sequence of second subsets 550, 560, 570, 580 of the plurality of predefined beam directions. The beam directions of each of the second subsets 550, 560, 570, 580 are adjacent to each other along the first spatial axis y. Further, the beam directions of each of the second subsets 550, 560, 570, 580 are offset along the second spatial axis x from the beam directions of a preceding one of the second subsets 550, 560, 570, 580 by a second non-zero number of intermediate beam directions of the plurality of predefined beam directions. For example, the beam direction 561 of the second subset 560 (column 30) is offset along the second spatial axis x from beam direction 571 of second first subset 570 (column 20) by nine intermediate beam directions of the plurality of predefined beam directions.

In the example of FIG. 5, it is assumed that the beam directions of each of the second subsets 550, 560, 570, 580 are offset along the second spatial axis x from the beam directions of a preceding one of the second subsets 550, 560, 570, 580 by a constant second non-zero number of intermediate beam directions of the plurality of predefined beam directions. However, the second number of intermediate beam directions between succeeding ones of the second subsets 550, 560, 570, 580 may vary. For example, the beam directions of the second subset 580 may be offset along the second spatial axis x from the beam directions of the second subset 570 by fifteen intermediate beam directions, whereas the beam directions of the second subset 570 may be offset along the second spatial axis x from the beam directions of the second subset 560 by nine intermediate beam directions. That is, the beam directions of each of the second subsets 550, 560, 570, 580 are offset along the second spatial axis x from the beam directions of a preceding one of the second subsets 550, 560, 570, 580 by one of a set of second non-zero numbers of intermediate beam directions of the plurality of predefined beam directions.

In the example of FIG. 5, the first number(s) of intermediate beam directions is (are) equal to the second number(s) of intermediate beam directions, so that the beam directions of the second subsets 550, 560, 570, 580 are directly adjacent to the beam directions of the first subsets 510, 520, 530, 540 along the second spatial axis x. For example, the beam directions of the second subsets 580 (column 10) are directly adjacent to the beam directions of the first subset 520 (column 11) along the second spatial axis x.

For the second sequence of beam directions (i.e. the second measurement) different subsets may be used. For example, light beams may be emitted to the environment along the beam directions of columns 2, 12, 22, 32 while the reflective surface 110 rotates about the rotation axis 120 along the first rotation direction, and light beams may be emitted to the environment along the beam directions of columns 9, 19, 29, 39 while the reflective surface 110 rotates about the rotation axis 120 along the opposite second rotation direction. Further measurements using different sequences of beam directions may be taken until the apparatus 100's field of view is completely scanned.

Using the first sequence of beam directions illustrated in FIG. 5 may allow to use a reflective surface 110 (e.g. a MEMS mirror) that oscillates (rotates) fast about the rotation axis 120. Using a fast oscillation reflective surface 110 may allow to reduce the sensitivity to external vibrations since the external vibrations are small compared to the natural acceleration. When using a MEMS mirror operated at resonance as reflective surface 110, the suspension may be made very stiff, which increases the frequency (and reduces the amplitude) of any parasitic modes (i.e. motion in unwanted directions, other than the direction of scanning/other than the rotation directions about the rotation axis 120). Also an actuator power may be reduced, and the chip carrying the MEMS mirror may be relatively small in size.

Moreover, the gaps between the first subsets and the gaps between the second subsets of beam directions in the first sequence of beam directions illustrated in FIG. 5 may allow to use slow light sources. In particular, the light sources may exhibit a respective minimum time between the emission of two succeeding light beams that is larger than the time required by the reflective surface for moving from a first position related to a first beam direction to a second position related to second beam direction that is directly adjacent to the first beam direction along the second spatial axis x.

Figure 6:
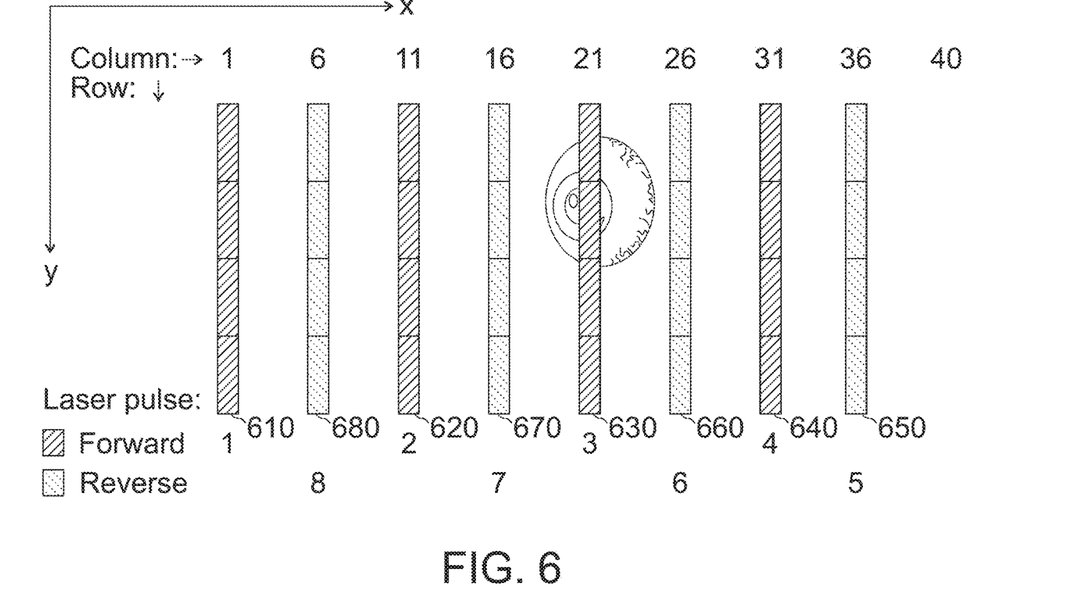

A slight variation of the first sequence of beam directions illustrated in FIG. 5 is illustrated in FIG. 6. While in FIG. 5, the beam directions of at least one of the second subsets 550, 560, 570, 580 are directly adjacent to the beam directions of one of the first subsets 510, 520, 530, 540 along the second spatial axis x, the beam direction of the second subsets 650, 660, 670, 680 are offset along the second spatial axis x from the beam directions of one of the first subsets 610, 620, 630, 640 by a non-zero third number of intermediate beam directions of the plurality of predefined beam directions in FIG. 6.

In the example of FIG. 6, it is again assumed that light beams are emitted to environment along the beam directions of the first subsets 610, 620, 630, 640 while the reflective surface 110 rotates about the rotation axis 120 along the first rotation direction, and that light beams are emitted to environment along the beam directions of the second subsets 650, 660, 670, 680 while the reflective surface 110 rotates about the rotation axis 120 along the opposite second rotation direction.

As illustrated in FIG. 6, the beam directions of the second subsets 650, 660, 670, 680 may be arranged along the second spatial axis x in the middle of the beam directions of the first subsets 610, 620, 630, 640. For example, the beam directions of the second subset 680 (column 6) are offset along the second spatial axis x from each of the beam directions of the first subset 610 (column 1) and the beam directions of the first subset 620 (column 11) by four intermediate beam directions.

In general, the third number of intermediate beam directions may be between 20% and 80% of the first number of intermediate beam directions between the first subsets 610, 620, 630, 640 (if the first number is constant), or be between 20% and 80% of one of the first numbers of intermediate beam directions between the first subsets 610, 620, 630, 640 (if the first number varies, see above).

When a human observer is present in the apparatus 100's field-of-view, (e.g. laser) light may enter the pupil of the eye. Depending on the distance of the pupil to the light sources of apparatus 100, emitted light beams along multiple neighboring (adjacent) columns may cover the pupil. The first sequence of beam directions illustrated in FIG. 6 may allow to stretch the time between the illuminations of these columns. Accordingly, subsequent light beams (e.g. laser pulses) reaching the pupil are far apart in time from each other in order to improve (laser) safety.

The first sequence of beam directions illustrated in FIG. 6 may further allow to make sure that neighboring (adjacent) columns are not illuminated in subsequent scans (i.e. the forward and the subsequent backward rotation of the reflective surface 110). By setting the third number of intermediate beam directions to a value between 20% and 80% of one of the first numbers of intermediate beam directions, the emitted light beams are as far apart from each other as possible. For example, the beam directions of the second subsets 650, 660, 670, 680 may be offset along the second spatial axis x from the beam directions of the first subsets 610, 620, 630, 640 by at least two intermediate beam directions (i.e. at least two columns may be skipped). This may ensure that only one beam direction heads to the pupil, if the pupil is close to the apparatus 100 (i.e. the plurality of light sources).

For the second sequence of beam directions (i.e. the second measurement) different subsets may be used. For example, light beams may be emitted to the environment along the beam directions of columns 2, 12, 22, 32 while the reflective surface 110 rotates about the rotation axis 120 along the first rotation direction, and light beams may be emitted to the environment along the beam directions of columns 7, 17, 27, 37 while the reflective surface 110 rotates about the rotation axis 120 along the opposite second rotation direction. Further measurements may be taken until the apparatus 100's field of view is completely scanned.

Figure 7:
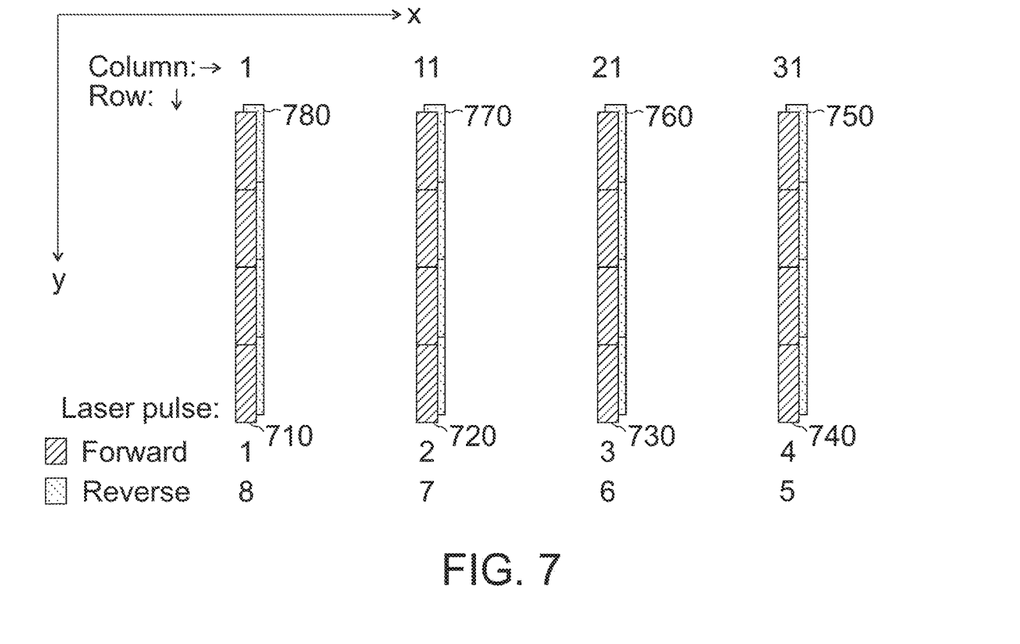

Another slight variation of the first sequence of beam directions illustrated in FIG. 5 is illustrated in FIG. 7. While in FIG. 5, the beam directions of at least one of the second subsets 550, 560, 570, 580 are directly adjacent to the beam directions of one of the first subsets 510, 520, 530, 540 along the second spatial axis x, the beam directions of the second subsets 750, 760, 770, 780 are equal to the beam directions of the first subsets 710, 720, 730, 740 in FIG. 7.

In the example of FIG. 7, it is again assumed that light beams are emitted to environment along the beam directions of the first subsets 710, 720, 730, 740 while the reflective surface 110 rotates about the rotation axis 120 along the first rotation direction, and that light beams are emitted to environment along the beam directions of the second subsets 750, 760, 770, 780 while the reflective surface 110 rotates about the rotation axis 120 along the opposite second rotation direction.

The first sequence of beam directions illustrated in FIG. 7 is an example for histogramming as described above. Since the same beam directions are illuminated a few time during the first measurement, the noise of the determined range data may be reduced and a maximum possible measurement range may be increased. Using the first sequence of beam directions illustrated in FIG. 7 allows repeatedly measure the same places/locations/objects in the environment with only small time gaps in between. Accordingly, motion blurring of moving objects (or if the laser scanner itself is moving) may be reduced. In other words, the quality of the measurement may be increased.

In the example of FIG. 7, each of the beam directions is illuminated (i.e. measured) two times within the first sequence (i.e. the first measurement). It is to be noted that each of the beam directions may be illuminated more often within the first sequence (e.g. 4, 6, 8 or more times). That is, the emission of light beams along the first sequence of beam directions as illustrated in FIG. 7 may be repeated during the first measurement.

For the second sequence of beam directions (i.e. the second measurement) different subsets may be used. For example, light beams may be emitted to the environment along the beam directions of columns 2, 12, 22, 32 while the reflective surface 110 rotates about the rotation axis 120 along the first rotation direction as well as along the opposite second rotation direction. Further measurements may be taken until the apparatus 100's field of view is completely scanned.

Figure 8:
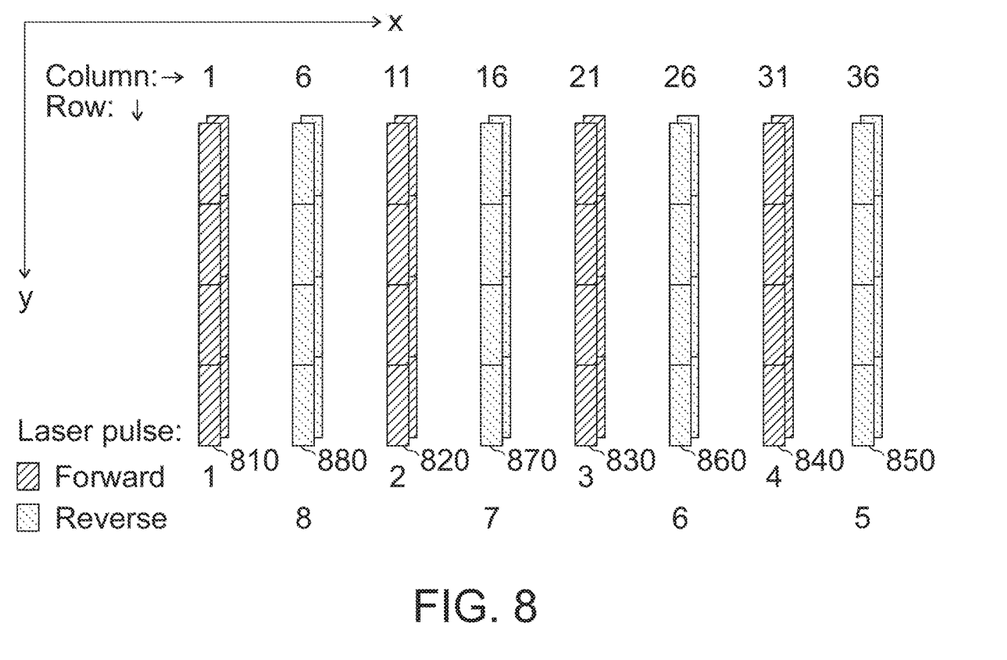

FIG. 8 further illustrates another example of histogramming as described in more general terms above in connection with FIG. 1. The histogramming of FIG. 8 is based on the sequence of beam directions illustrated in FIG. 6.

Like for the sequence of beam directions illustrated in FIG. 6, light beams are emitted to environment along the beam directions of the first subsets 810, 820, 830, 840 while the reflective surface 110 rotates for the first time about the rotation axis 120 along the first rotation direction, and light beams are emitted to environment along the beam directions of the second subsets 850, 860, 870, 880 while the reflective surface 110 rotates for the first time about the rotation axis 120 along the opposite second rotation direction. Subsequently, while the reflective surface 110 rotates for the second time about the rotation axis 120 along the first rotation direction, light beams are again emitted to environment along the beam directions of the first subsets 810, 820, 830, 840. Further, while the reflective surface 110 rotates for the second time about the rotation axis 120 along the opposite second rotation direction, and light beams are again emitted to environment along the beam directions of the second subsets 850, 860, 870, 880.

In other words, the controller 150 controls the emission times of the four light sources so that the reflective surface 110 repeatedly emits the plurality of light beams to the environment according to the first sequence of beam directions of FIG. 6 during the first measurement. It is to be noted that the reflective surface 110 may emit the plurality of light beams not only two times to the environment according to the first sequence of beam directions, but by any number of repetitions (e.g. 3, 4, 5 or more times).

Further, it is to be noted that light beams according to any first sequence of beam directions may be repeatedly emitted to the environment, not only the first sequence of beam directions of FIG. 6. It is evident, that also second, third and further sequences of beam directions used in subsequent second, third and further measurements may be repeatedly emitted to the environment during the respective measurement.

In case of repetitive measurements, (laser) safety may be increased by not illuminating the same pixels in the reverse scan as in the forward scan (see above discussed in connection with FIG. 6). If two different sets of columns are used for the forward and reverse scans (i.e. different subsets of beam directions for different rotation directions of the reflective surface 110), then the time between the light beams (e.g. laser pulses) illuminating the same column doubles. Further, the total measurement time double and slightly increase the motion blurring. However, a trade-off may be made between (laser) safety and measurement quality.

As discussed above in connection with FIG. 6, the number of intermediate beam position along the second spatial axis x between one of the second subsets 850, 860, 870, 880 and an adjacent one of the first subsets 810, 820, 830, 840 may be adjusted.

The plurality of light beams emitted to the environment may have a rectangular cross-section in a plane perpendicular to its beam direction as indicated above in FIGS. 1 to 8. The rectangular cross-sections of the plurality of light beams may, e.g., be collinear.

Figure 9:
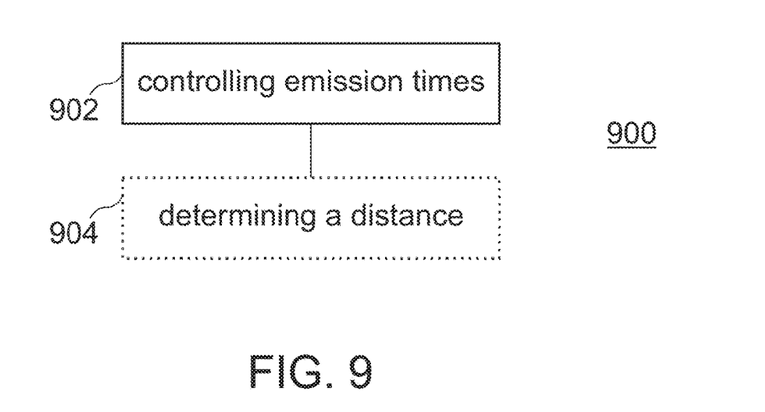
FIG. 9 illustrates a flowchart of an example of a method for LIDAR according to one or more embodiments.

An example of a method 900 for LIDAR is illustrated by means of a flowchart in FIG. 9. Method 900 uses a reflective surface configured to oscillate about a rotation axis, and a plurality of light sources each configured to controllably emit a respective light beam via an optical system onto the reflective surface. Method 900 comprises controlling 902 emission times of the plurality of light sources so that the reflective surface emits a plurality of light beams to the environment according to a first sequence of beam directions for a first measurement, and according to a different second sequence of beam directions for a subsequent second measurement.

As described above, method 900 may further comprise determining 904 a distance to an object in the environment based on the emission time of one of the plurality of light beams and a reception time of a reflection of the one of the plurality of light beams from the object.

More details and aspects of the method are mentioned in connection with the proposed technique or one or more examples described above (e.g. FIGS. 1-8). The method may comprise one or more additional optional features corresponding to one or more aspects of the proposed technique or one or more examples described above.

Figure 10:
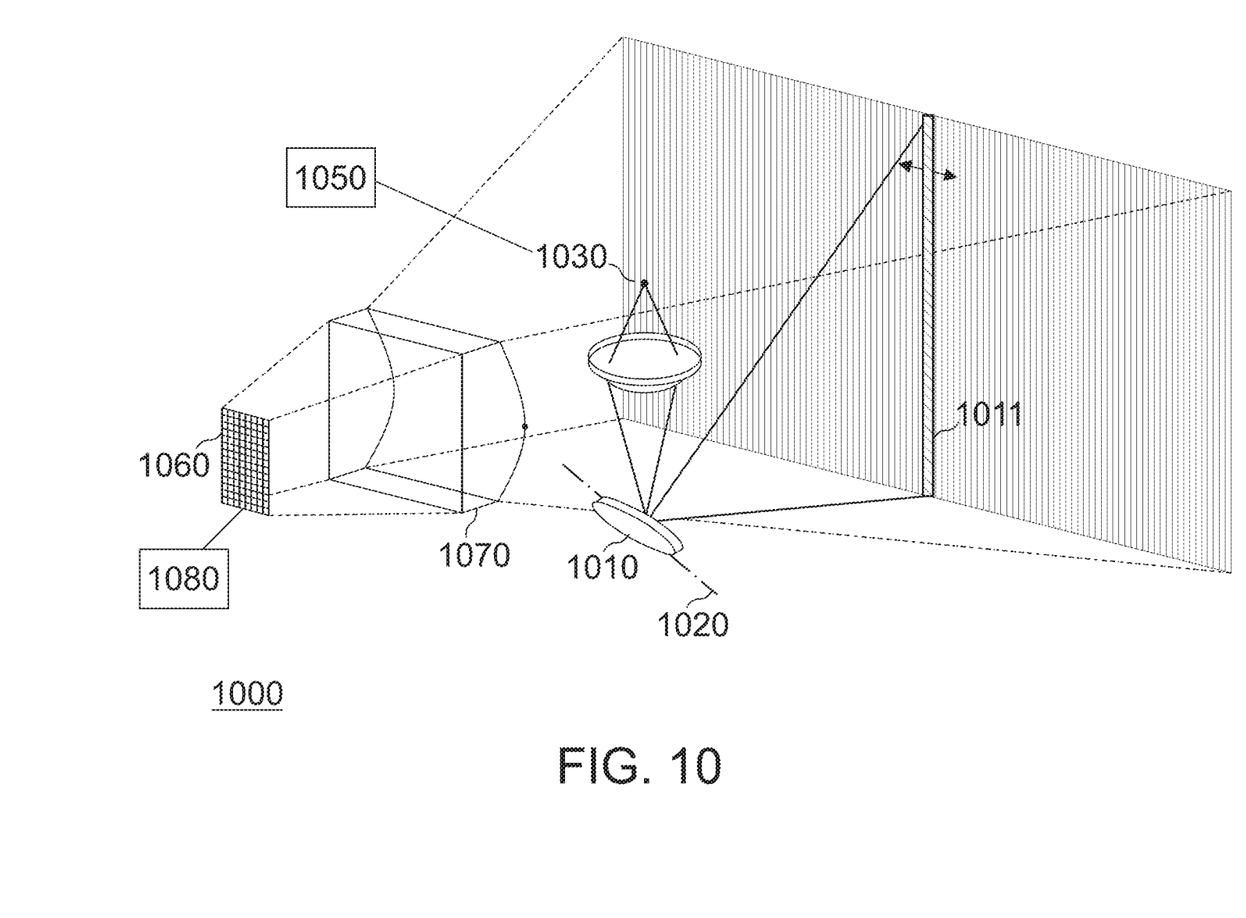
FIG. 10 illustrates another example of an apparatus for LIDAR according to one or more embodiments.

FIG. 10 illustrates another apparatus 1000 for LIDAR. Like apparatus 100 illustrated in FIG. 1, apparatus 1000 comprises a reflective surface 1010 configured to oscillate about a rotation axis 1020. Further, apparatus 1000 comprises a (single) light source 1030 configured to controllably emit a light beam via an optical system 1040 onto the reflective surface 1010. The oscillation of the reflective surface 1010 is identical to the oscillation movement of reflective surface 110 of apparatus 100. Also, the light source 1030 and the optical system 1040 are identical to one of the plurality of light sources 130 and the optical system 140 described above in connection with FIG. 1. It is, hence, referred to the above description of FIG. 1.

Apparatus 1000 additionally comprises a controller 1050 configured to control emission times of the light source 1030 so that the reflective surface 1010 emits a plurality of light beams to the environment according to a first sequence of beam directions for a first measurement, and according to a second sequence of beam directions for a subsequent (i.e. a next, immediately following) second measurement. For illustrative purposes, a light beam 1011 emitted to the environment is illustrated in FIG. 10.

The beam directions of the first sequence are angularly offset from each other by one of a set of first angles, wherein the beam directions of the second sequence are angularly offset from each other by one of a set of second angles. The angles of the first set of angles may be different or identical to the angles of the second set of angles (e.g. the angular offset(s) between the beam directions of the second sequence may be equal to those between the beam directions of the first sequence). The beam directions of the first sequence and the beam directions of the second sequence are selected from a plurality of predefined beam directions. Further, the beam directions of the second sequence are offset (along a spatial axis) from the beam directions of the first sequence by more than one intermediate beam direction of the plurality of predefined beam directions.

The controller 1050 may allow to sequentially and fully scan (light, illuminate) partial areas of the apparatus 1000's field of view in order to enable a full scan of the environment. The first sequence of beam directions corresponds to a first part of the apparatus 1000's field of view, whereas the second sequence of beam directions corresponds to a different second part of the apparatus 1000's field of view.

Offsetting the beam directions of (immediately) succeeding measurements by more than one intermediate beam direction of the plurality of beam directions may allow to increase safety since non-adjacent beam directions are used. Accordingly, the emission of (too) high amounts of optical energy to a specific point in the environment (e.g. to a human eye) may be avoided. For example, the beam directions of the second sequence may be centered between beam directions of the first sequence (similarly to the beam pattern illustrated in FIG. 6 for the multiple light sources).

The controller 1050 may be further configured to control emission times of the light source 1030 so that the reflective surface 1010 emits a plurality of light beams to the environment according to a third and further sequences of beam directions for third and further measurements. Similarly, the beam directions of the third sequence are offset (along the spatial axis) from the beam directions of the second sequence by more than one intermediate beam direction of the plurality of predefined beam directions.

Similar to apparatus 100, the reflections of the emitted light beams are received by a photodetector 1060 via another optical system 1070. A processor 1080 again determines a distance (of the apparatus 1000) to an object in the environment based on the emission time of one of the plurality of light beams and a reception time of the reflection from the object in the environment. For details, it is, hence, referred to the above description of FIG. 1.

The controller 1050 may be further configured to control the emission times of the light source 1030 so that the reflective surface 1010 repeatedly emits the plurality of light beams to the environment according to the first sequence of beam directions during the first measurement. Accordingly, light beams may be repeatedly emitted along second, third, and further sequences of beam directions (during second, third and further subsequent measurements) until light beams are emitted along all of the plurality of beam directions. That is, apparatus 1000 may use histogramming.

Further, the controller 1050 may be configured to control the light source 1030 to emit light beam related to a first part of the first sequence while the reflective surface 1010 rotates about the rotation axis 1020 along a first rotation direction, and to control the light source 1030 to emit light beams related to a second part of the first sequence while the reflective surface 1010 rotates about the rotation axis 1020 along an opposite second rotation direction. Similarly, the different parts of second, third and further sequences may be emitted to the environment while the reflective surface 1010 rotates about the rotation axis 1020 along different rotation directions.

More details and aspects of apparatus 1000 are mentioned in connection with the proposed technique or one or more examples described above (e.g. FIGS. 1-8). Apparatus 1000 may comprise one or more additional optional features corresponding to one or more aspects of the proposed technique or one or more examples described above.

The first sequences of beam directions (beam patterns) described above in connection with FIGS. 2, 3, 5, 6, 7 and 8 may be used for any LIDAR system, irrespective of its internal configuration (e.g. number light sources, presence of oscillating reflective surface etc.).

Therefore, some examples further relate to another apparatus for LIDAR. The apparatus comprises an illumination circuit configured to emit a plurality of light beams to the environment according to a first sequence of beam directions for a first measurement, and according to a second sequence of beam directions for a subsequent second measurement. The first sequence of beam directions for the first measurement is one of the first sequences of beam directions described in the present disclosure (e.g. above in connection with FIGS. 2, 3, 5, 6, 7 and 8). Further, the illumination circuit may be configured to repeatedly emit the plurality of light beams to the environment according to the first sequence of beam directions during the first measurement.

As described above, the apparatus for LIDAR may further comprises a reception and evaluation circuit configured to receive a reflection of at least one of the plurality of light beams from an object in the environment, and to determine a distance to the object based on the emission time of the one of the plurality of light beams and a reception time of the reflection. Further, the apparatus for LIDAR may comprise one or more additional optional features corresponding to one or more aspects of the proposed technique or one or more examples described above.

Examples of the present application additionally relate to a still further apparatus for LIDAR. The apparatus comprises an illumination circuit configured to repeatedly emit a plurality of light beams to the environment according to a first sequence of beam directions for a first measurement, and to emit a plurality of light beams according to a second sequence of beam directions for a subsequent second measurement.

As described above, the apparatus for LIDAR may further comprises a reception and evaluation circuit configured to receive a reflection of at least one of the plurality of light beams from an object in the environment, and to determine a distance to the object based on the emission time of the one of the plurality of light beams and a reception time of the reflection. Further, the apparatus for LIDAR may comprise one or more additional optional features corresponding to one or more aspects of the proposed technique or one or more examples described above. For example, the first sequence of beam directions for the first measurement may be one of the first sequences of beam directions described in the present disclosure (e.g. above in connection with FIGS. 2, 3, 5, 6, 7 and 8).

The aspects and features mentioned and described together with one or more of the previously detailed examples and figures, may as well be combined with one or more of the other examples in order to replace a like feature of the other example or in order to additionally introduce the feature to the other example.

Examples may further be or relate to a computer program having a program code for performing one or more of the above methods, when the computer program is executed on a computer or processor. Steps, operations or processes of various above-described methods may be performed by programmed computers or processors. Examples may also cover program storage devices such as digital data storage media, which are machine, processor or computer readable and encode machine-executable, processor-executable or computer-executable programs of instructions. The instructions perform or cause performing some or all of the acts of the above-described methods. The program storage devices may comprise or be, for instance, digital memories, magnetic storage media such as magnetic disks and magnetic tapes, hard drives, or optically readable digital data storage media. Further examples may also cover computers, processors or control units programmed to perform the acts of the above-described methods or (field) programmable logic arrays ((F)PLAs) or (field) programmable gate arrays ((F) PGAs), programmed to perform the acts of the above-described methods.

The description and drawings merely illustrate the principles of the disclosure. Furthermore, all examples recited herein are principally intended expressly to be only for pedagogical purposes to aid the reader in understanding the principles of the disclosure and the concepts contributed by the inventor(s) to furthering the art. All statements herein reciting principles, aspects, and examples of the disclosure, as well as specific examples thereof, are intended to encompass equivalents thereof.

A block diagram may, for instance, illustrate a high-level circuit diagram implementing the principles of the disclosure. Similarly, a flow chart, a flow diagram, a state transition diagram, a pseudo code, and the like may represent various processes, operations or steps, which may, for instance, be substantially represented in computer readable medium and so executed by a computer or processor, whether or not such computer or processor is explicitly shown. Methods disclosed in the specification or in the claims may be implemented by a device having means for performing each of the respective acts of these methods.

It is to be understood that the disclosure of multiple acts, processes, operations, steps or functions disclosed in the specification or claims may not be construed as to be within the specific order, unless explicitly or implicitly stated otherwise, for instance for technical reasons. Therefore, the disclosure of multiple acts or functions will not limit these to a particular order unless such acts or functions are not interchangeable for technical reasons. Furthermore, in some examples a single act, function, process, operation or step may include or may be broken into multiple sub-acts, -functions, -processes, -operations or -steps, respectively. Such sub acts may be included and part of the disclosure of this single act unless explicitly excluded.

Furthermore, the following claims are hereby incorporated into the detailed description, where each claim may stand on its own as a separate example. While each claim may stand on its own as a separate example, it is to be noted that—although a dependent claim may refer in the claims to a specific combination with one or more other claims—other examples may also include a combination of the dependent claim with the subject matter of each other dependent or independent claim. Such combinations are explicitly proposed herein unless it is stated that a specific combination is not intended. Furthermore, it is intended to include also features of a claim to any other independent claim even if this claim is not directly made dependent to the independent claim.

What is claimed is:

1. An apparatus for light detection and ranging, comprising:
   a reflective surface configured to oscillate about a rotation axis;
   a plurality of light sources each configured to controllably emit a respective light beam via an optical system onto the reflective surface; and
   a controller configured to control emission times of the plurality of light sources so that the reflective surface emits a plurality of light beams to an environment at a plurality of beam directions that define a full scan of a field of view,
   wherein the controller is configured perform a plurality of measurements in a sequential order, including a first measurement followed by a second measurement,
   wherein the controller is configured to control the emission times of the plurality of light sources so that the reflective surface emits a first portion of the plurality of light beams according to a first sequence of beam directions that is repeated a number of times during the first measurement, and emits a second portion of the plurality of light beams according to a second sequence of beam directions that is repeated the number of times during the second measurement such that each of the plurality of measurements targets an exclusive sequence of beam directions that is targeted a plural number of times by emitted light before a next measurement of the plurality of measurements is performed according to the sequential order thereof.

2. The apparatus of claim 1, wherein the controller is further configured to control an emission sequence of the plurality of light sources to sequentially emit their respective light beam one-by-one onto the reflective surface during each of the plurality of measurements such that only one of the plurality of light sources emits a respective light beam at a time.

3. The apparatus of claim 2, wherein:
   the first sequence of beam directions comprises a sequence of a first subset and a second subset of a plurality of predefined beam directions,
   beam directions of the first subset of the plurality of predefined beam directions are adjacent to each other along a first spatial axis and are offset along a second spatial axis from each other by a first number of intermediate beam directions of the plurality of predefined beam directions, and
   beam directions of the second subset of the plurality of predefined beam directions are offset along the second spatial axis from the beam directions of the first subset by a second number of intermediate beam directions of the plurality of predefined beam directions.

4. The apparatus of claim 3, wherein at least one of the first number and the second number is larger than one.

5. The apparatus of claim 3, wherein:
   the first sequence of beam directions further comprises a sequence of a third subset of the plurality of predefined beam directions,
   beam directions of the third subset of the plurality of predefined beam directions are offset along the second spatial axis from the beam directions of the second subset by a third number of intermediate beam directions of the plurality of predefined beam directions, and
   the third number is between 60% and 140% of the second number.

6. The apparatus of claim 3, wherein the plurality of predefined beam directions are uniformly distributed along the first spatial axis and along the second spatial axis.

7. The apparatus of claim 2, wherein:
   the first sequence of beam directions comprises a subset of a plurality of predefined beam directions a plurality of times, and
   the controller is further configured to control the emission times of the plurality of light sources so that an emission sequence of the plurality of light sources related to the subset of the plurality of predefined beam directions varies.

8. The apparatus of claim 2, wherein:
   the controller is further configured to control the plurality of light sources to emit respective light beams related to a first part of the first sequence of beam directions while the reflective surface rotates about the rotation axis along a first rotation direction, and to control the plurality of light sources to emit respective light beams related to a second part of the first sequence of beam directions while the reflective surface rotates about the rotation axis along an opposite second rotation direction.

9. The apparatus of claim 1, wherein the controller is further configured to control at least two of the plurality of light sources to simultaneously emit their respective light beam onto the reflective surface.

10. The apparatus of claim 9, wherein:
the first sequence of beam directions comprises a sequence of first subsets of a plurality of predefined beam directions, and
beam directions of each of the first subsets of the plurality of predefined beam directions are adjacent to each other along a first spatial axis and are offset along a second spatial axis from the beam directions of a preceding one of the first subsets by one of a set of first non-zero numbers of intermediate beam directions of the plurality of predefined beam directions.

11. The apparatus of claim 10, wherein:
the first sequence of beam directions further comprises a sequence of second subsets of the plurality of predefined beam directions, and
beam directions of each of the second subsets of the plurality of predefined beam directions are adjacent to each other along the first spatial axis and are offset along the second spatial axis from the beam directions of a preceding one of the second subsets by one of a set of second non-zero numbers of intermediate beam directions of the plurality of predefined beam directions.

12. The apparatus of claim 11, wherein:
the first numbers are equal to the second numbers, and
the beam directions of one of the second subsets are directly adjacent to the beam directions of one of the first subsets along the second spatial axis.

13. The apparatus of claim 11, wherein:
the first numbers are equal to the second numbers, and
the beam directions of one of the second subsets are offset along the second spatial axis from the beam directions of one of the first subsets by a third number of intermediate beam directions of the plurality of predefined beam directions, and
the third number is between 20% and 80% of one the first numbers.

14. The apparatus of claim 11, wherein:
the first numbers are equal to the second numbers, and
the beam directions of one of the second subsets are equal to the beam directions of one of the first subsets.

15. The apparatus of claim 11, wherein:
the controller is further configured to control the plurality of light sources to emit respective light beams related to the first subsets of the plurality of predefined beam directions while the reflective surface rotates about the rotation axis along a first rotation direction, and to control the plurality of light sources to emit respective light beams related to the second subsets of the plurality of predefined beam directions while the reflective surface rotates about the rotation axis along an opposite second rotation direction.

16. The apparatus of claim 1, wherein at least one of the plurality of light beams has a rectangular cross-section in a plane perpendicular to its beam direction.

17. The apparatus of claim 16, wherein the rectangular cross-sections of the plurality of light beams are collinear.

18. The apparatus of claim 1, wherein the beam directions of the second sequence of beam directions are different from the beam directions of the first sequence of beam directions.

19. The apparatus of claim 1, wherein beam directions of the second sequence of beam directions are offset along a spatial axis from beam directions of the first sequence of beam directions.

20. The apparatus of claim 1, further comprising:
a photodetector configured to receive a reflection of at least one of the plurality of light beams from an object in the environment; and
a processor configured to determine a distance to the object based on the emission time of the one of the plurality of light beams and a reception time of the reflection.

21. The apparatus of claim 20, wherein the photodetector comprises a plurality of photosensitive elements arranged in at least one row, wherein each of the plurality of photosensitive elements is configured to receive the reflection of the at least one of the plurality of light beams from the object in the environment.

22. The apparatus of claim 1, wherein:
each exclusive sequence of beam directions is confined within a different contiguous portion of the field of view,
each contiguous portion is mutually exclusive from other contiguous portions of the field of view,
each beam direction of the first sequence of beam directions is sequentially targeted one at a time by emitted light, and
each beam direction of the second sequence of beam directions is sequentially targeted one at a time by emitted light.

23. The apparatus of claim 1, wherein each exclusive sequence of beam directions consists of beam directions that are mutually exclusive from beam directions of other exclusive sequences of beam directions, wherein each beam direction of the first sequence of beam directions is sequentially targeted one at a time by emitted light, and wherein each beam direction of the second sequence of beam directions is sequentially targeted one at a time by emitted light.

24. A method for light detection and ranging using a reflective surface configured to oscillate about a rotation axis, and using a plurality of light sources each configured to controllably emit a respective light beam via an optical system onto the reflective surface, the method comprising:
controlling emission times of the plurality of light sources so that the reflective surface emits a plurality of light beams to an environment at a plurality of beam directions that define a full scan of a field of view, including performing a plurality of measurements in a sequential order, including a first measurement followed by a second measurement, and further including controlling the emission times of the plurality of light sources so that the reflective surface emitting a first portion of the plurality of light beams according to a first sequence of beam directions that is repeated a number of times for the first measurement and emitting a second portion of the plurality of light beams according to a different second sequence of beam directions that is repeated the number of times for the second measurement such that each of the plurality of measurements targets an exclusive sequence of beam directions that is targeted a plural number of times by emitted light before a next measurement of the plurality of measurements is performed according to the sequential order thereof.

25. The method of claim 24, further comprising:
determining a distance to an object in the environment based on the emission time of one of the plurality of light beams and a reception time of a reflection of the one of the plurality of light beams from the object.

26. An apparatus for light detection and ranging, comprising:
a controller configured to perform a plurality of measurements in a sequential order, including a first measurement followed by a second measurement; and
an illumination circuit configured to:
emit a first plurality of light beams to the environment according to a first sequence of beam directions for the first measurement such that the first sequence of beam directions is repeated a plural number of times;
repeat an emission of the first plurality of light beams to the environment according to the first sequence of beam directions at least once during the first measurement;
emit a second plurality of light beams according to a second sequence of beam directions for the second measurement; and
repeat an emission of the second plurality of light beams to the environment according to the second sequence of beam directions at least once during the second measurement,
wherein each of the plurality of measurements targets an exclusive sequence of beam directions that is targeted a plural number of times by emitted light before a next measurement of the plurality of measurements is performed according to the sequential order thereof.

27. An apparatus for light detection and ranging, comprising:
a reflective surface configured to oscillate about a rotation axis;
a light source configured to controllably emit a light beam via an optical system onto the reflective surface; and
a controller configured to perform a plurality of measurements in a sequential order, including a first measurement followed by a second measurement, and control emission times of the light source so that the reflective surface emits a plurality of light beams to an environment according to a first sequence of beam directions for the first measurement and according to a second sequence of beam directions for the second measurement,
wherein beam directions of the first sequence of beam directions and beam directions of the second sequence of beam directions are mutually exclusive from each other,
wherein the beam directions of the first sequence of beam directions are angularly offset from each other by one of a set of first angles,
wherein the beam directions of the second sequence of beam directions are angularly offset from each other by one of a set of second angles,
wherein the beam directions of the first sequence of beam directions and the second sequence of beam directions are selected from a plurality of predefined beam directions that define a full scan of a field of view, and
wherein the beam directions of the second sequence of beam directions are offset from the beam directions of the first sequence of beam directions by more than one intermediate beam direction of the plurality of predefined beam directions,
wherein the controller is configured to control the emission times of the plurality of light sources so that the reflective surface emits a first portion of the plurality of light beams according to the first sequence of beam directions that is transmitted a plural a number of times during the first measurement and emits a second portion of the plurality of light beams according to the second sequence of beam directions that is transmitted the plural number of times during the second measurement such that each of the plurality of measurements targets an exclusive sequence of beam directions that is targeted the plural number of times by emitted light before a next measurement of the plurality of measurements is performed according to the sequential order thereof.

28. The apparatus of claim 27, wherein the controller is further configured to control the light source to emit light beams related to a first part of the first sequence of beam directions while the reflective surface rotates about the rotation axis along a first rotation direction, and to control the light source to emit light beams related to a second part of the first sequence of beam directions while the reflective surface rotates about the rotation axis along an opposite second rotation direction.

* * * * *